(12) United States Patent
Kadowaki

(10) Patent No.: US 11,016,618 B2
(45) Date of Patent: *May 25, 2021

(54) SENSOR DEVICE FOR DETECTING PEN SIGNAL TRANSMITTED FROM PEN

(71) Applicant: Wacom Co., Ltd., Saitama (JP)

(72) Inventor: Jun Kadowaki, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/027,452

(22) Filed: Sep. 21, 2020

(65) Prior Publication Data

US 2021/0004122 A1 Jan. 7, 2021

Related U.S. Application Data

(63) Continuation of application No. 16/742,800, filed on Jan. 14, 2020, now Pat. No. 10,782,836.

(30) Foreign Application Priority Data

Jan. 25, 2019 (JP) .............................. JP2019-011017

(51) Int. Cl.
*G06F 3/044* (2006.01)
*G06F 3/0354* (2013.01)

(52) U.S. Cl.
CPC ........ *G06F 3/0442* (2019.05); *G06F 3/03545* (2013.01)

(58) Field of Classification Search
CPC ........................... G06F 3/0442; G06F 3/03545
See application file for complete search history.

(56) References Cited

U.S. PATENT DOCUMENTS

| 9,360,972 | B1 | 6/2016 | Avery et al. |
| 2010/0085325 | A1* | 4/2010 | King-Smith ........ G06F 3/04162 345/174 |
| 2014/0267187 | A1* | 9/2014 | Cooke .................. G06F 3/0442 345/179 |
| 2015/0091858 | A1* | 4/2015 | Rosenberg ............. G06F 3/045 345/174 |
| 2016/0373702 | A1 | 12/2016 | Miyasaka et al. |

(Continued)

FOREIGN PATENT DOCUMENTS

| JP | 2014-63249 A | 4/2014 |
| JP | 2017-91135 A | 5/2017 |

*Primary Examiner* — Andrew Sasinowski
(74) *Attorney, Agent, or Firm* — Seed IP Law Group LLP

(57) ABSTRACT

A sensor device comprises an integrated circuit and a sensor panel. The sensor panel includes: a plurality of first linear electrodes disposed in a detection region; a plurality of first routing traces; a plurality of first terminals disposed along one edge of the sensor panel parallel to a second direction; and a first guard trace extending and disposed on one side of the plurality of first routing traces farther away from the detection region. A first trace is one of the plurality of first routing traces connected to a first electrode that is a first linear electrode disposed farthest away from the plurality of first terminals among the plurality of first linear electrodes. A separation distance between the first trace and the first guard trace is not constant in the second direction in a first region adjacent to the detection region in the second direction. In the first region, the first guard trace has a portion intersecting a first direction.

12 Claims, 8 Drawing Sheets

(56) References Cited

U.S. PATENT DOCUMENTS

| | | |
|---|---|---|
| 2017/0131842 A1 | 5/2017 | Hashiguchi |
| 2019/0196629 A1 | 6/2019 | Shepelev et al. |
| 2020/0089343 A1 | 3/2020 | Kadowaki et al. |
| 2020/0159386 A1* | 5/2020 | Saito .................... G06F 3/0446 |
| 2020/0201509 A1 | 6/2020 | Kadowaki |
| 2020/0241698 A1* | 7/2020 | Kadowaki ........... G06F 3/03545 |

* cited by examiner

SENSOR DEVICE FOR DETECTING PEN SIGNAL TRANSMITTED FROM PEN

BACKGROUND

Technical Field

The present disclosure relates to a sensor panel for detecting a pen signal transmitted from a pen, and more particularly, to a sensor panel including guard traces for absorbing electromagnetic noise entering from outside.

Description of the Related Art

In a tablet electronic apparatus having a function of detecting the position of a finger or a stylus, a sensor panel is disposed on a display panel. The sensor panel includes a plurality of linear electrodes including a plurality of X electrodes and a plurality of Y electrodes. The plurality of X electrodes extend in a Y direction and are disposed at equal intervals in an X direction. The plurality of Y electrodes extend in the X direction and are disposed at equal intervals in the Y direction. The display panel includes a bezel region in which a plurality of flexible printed circuit (FPC) connection terminals and routing traces are provided for corresponding ones of the plurality of linear electrodes, respectively. Each routing trace electrically connects the corresponding linear electrode to the corresponding FPC connection terminal. The FPC connection terminals are connected to terminals on a flexible printed circuit board by pressure bonding, and are connected to a control integrated circuit (IC) through routing traces on the flexible printed circuit board.

An active pen is known as one type of stylus. The active pen is a stylus that includes a power supply section and a signal processing circuit, and is capable of transmitting a pen signal by supplying an electrical charge, which is proportional to a signal generated by the signal processing circuit, to an electrode (pen electrode) disposed in the vicinity of a pen tip. The pen signal includes a position signal and a data signal. The position signal is a burst signal for indicating the position of the active pen. The data signal includes various types of data including, for example, pen pressure data indicating a value of the pen pressure detected by the active pen, data indicating an on/off state of an operation button provided on a side surface or an end portion of the active pen, and a unique identification (ID) prestored in the active pen. At the time of detection of the active pen, the pen signal is received by some of the linear electrodes of the sensor panel in the vicinity of the pen tip, and is supplied to the IC via the FPC connection terminals described above. The IC detects the position of the active pen in a touch surface by determining the X coordinate of the active pen on the basis of the reception levels of the pen signal at the X electrodes while determining the Y coordinate of the active pen on the basis of the reception levels of the pen signal at the Y electrodes.

Japanese Patent Laid-open No. 2017-091135 (hereinafter referred to as Patent Document 1) discloses a projection-type capacitive touch screen, which is one type of sensor panel. In this touch screen, as illustrated in FIG. 2 of Patent Document 1, an outermost shielding trace, to which a ground potential is supplied, extends along an outer periphery of the touch screen having a rectangular shape. According to Patent Document 1, the outermost shielding trace serves as a guard trace for absorbing electromagnetic noise entering from outside to prevent deterioration of position detection performance.

Japanese Patent Laid-open No. 2014-063249 discloses a position detecting device capable of detecting both a finger and an active pen. In this position detecting device, reception signals at a plurality of electrodes are input into a differential amplifier, and the position of the finger or the active pen is determined on the basis of the reception level of an output signal of the differential amplifier. The position detecting device is configured in this manner to remove the effect of external noise, particularly, common mode noise (noise entering a plurality of linear electrodes in the same direction). Hereinafter, the method of detecting a position using a differential amplifier in this manner will be referred to as "differential method."

BRIEF SUMMARY

However, according to the findings of the study conducted by the inventor of the present application, the configuration of the outermost shielding trace disclosed in Patent Document 1 does not sufficiently block electromagnetic noise entering from outside. This may be because the routing traces and the outermost shielding trace are too far apart. Thus, the inventor has examined another configuration in which a guard trace extends along the routing traces. However, the inventor has found that this configuration raises another issue when the above-described differential method is used. Ideally, the capacitance between each routing trace and the guard trace is the same value among all of the routing traces in order to remove common mode noise using the differential method. However, extending the guard trace along the routing traces results in an increase in the capacitance between the guard trace and a routing trace disposed at an outermost position among the plurality of routing traces extending side by side. This raises the possibility that common mode noise may not be sufficiently removed by the differential method.

According to one aspect of the present disclosure, a sensor panel is provided which is capable of sufficiently blocking electromagnetic noise entering from outside without unduly impacting the removal of common mode noise by the differential method.

A sensor panel according to one embodiment of the present disclosure is a sensor panel connected to an integrated circuit (IC) for detecting a position of an active pen in a detection region of the sensor panel. The sensor panel includes: a plurality of first linear electrodes extending in a second direction in the detection region and are disposed side by side in a first direction perpendicular to the second direction in the detection region; a plurality of first routing traces disposed to be connected to corresponding ones of the plurality of first linear electrodes and extending in parallel with each other at an equal pitch; and a plurality of first terminals disposed side by side along one edge of the sensor panel and each connecting a corresponding one of the plurality of first routing traces to the IC, the one edge of the sensor panel being parallel to the second direction. The sensor panel further includes a first guard trace extending and disposed on one side of the plurality of first routing traces farther from the detection region compared with another side of the plurality of first routing traces which is closer to the detection region. In a first region adjacent to the detection region in the second direction, a separation distance between a first trace and the first guard trace in the second direction is not constant, wherein the first trace is one of the plurality of first routing traces connected to a first electrode that is disposed farthest away from the plurality of first terminals among the plurality of first linear electrodes. In the first region, the first guard trace has a portion intersecting the first direction.

According to one embodiment of the present disclosure, the first guard trace may extend and be disposed sufficiently away from the first trace in a region in which a component other than a guard trace such as a metal frame of a display panel overlapped with the sensor panel is expected to block electromagnetic noise. For example, this region can be a "second" region, which is within the first region and which corresponds to a range including less than all of the first linear electrodes, wherein the less than all of the plurality of first linear electrodes includes the first electrode. Moreover, the first guard trace may extend and be disposed sufficiently close to the first trace in a region in which no component other than the guard trace is expected to block the electromagnetic noise. For example, this region can be a "third" region, which is also within the first region but is other than the second region. Therefore, the electromagnetic noise entering from outside can be sufficiently blocked without unduly impacting the removal of common mode noise by a differential method.

DETAILED DESCRIPTION

Hereinafter, an embodiment of the present disclosure will be described in detail with reference to the accompanying drawings.

Figure 1:
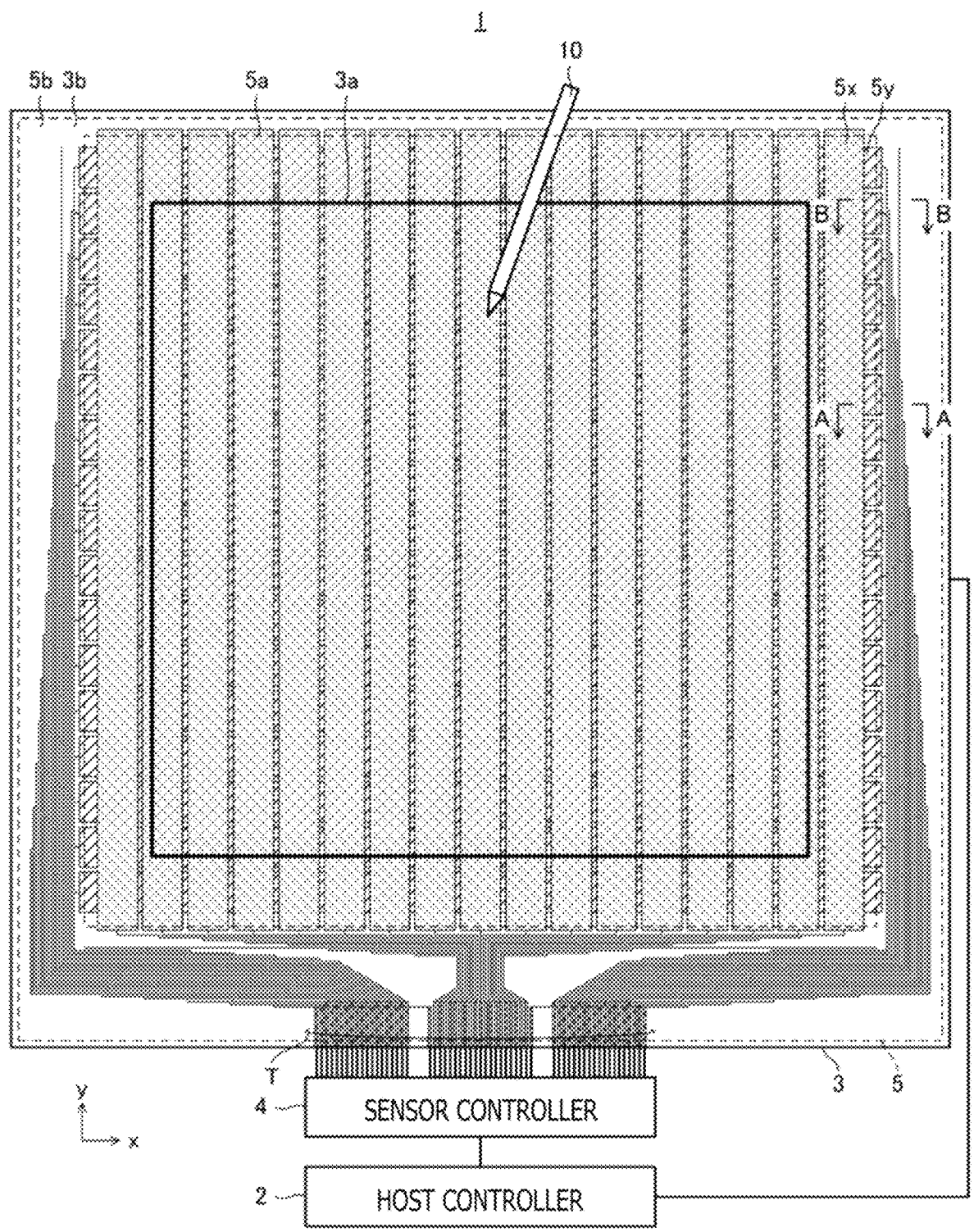
FIG. 1 is a schematic diagram illustrating configurations of an electronic apparatus and an active pen according to an embodiment of the present disclosure.
Figure 2A:
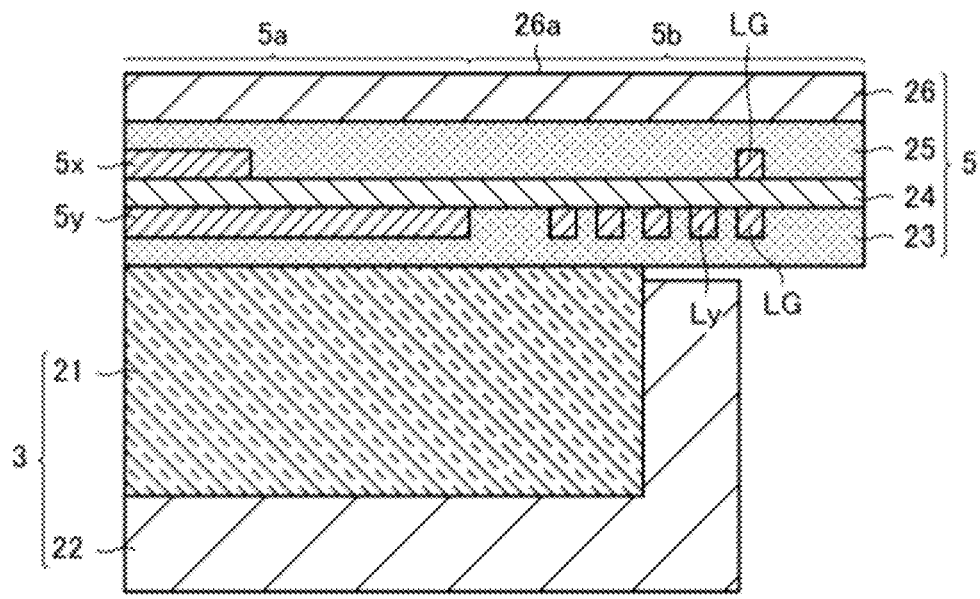
FIG. 2A is a cross-sectional view of the electronic apparatus taken along line A-A illustrated in FIG. 1.
Figure 2B:
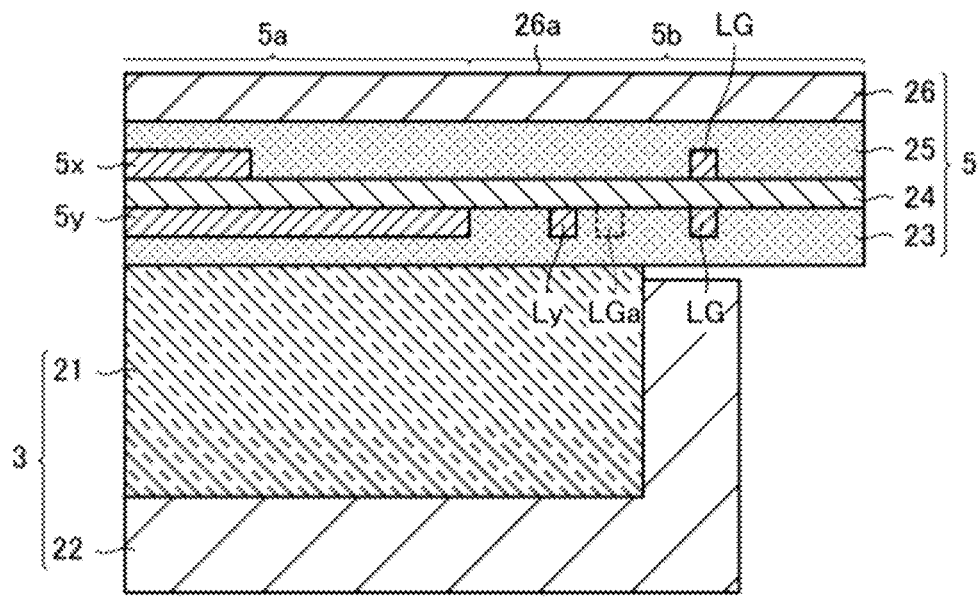
FIG. 2B is a cross-sectional view of the electronic apparatus taken along line B-B illustrated in FIG. 1.

FIG. 1 is a diagram illustrating configurations of an electronic apparatus 1 and an active pen 10 according to the first embodiment of the present disclosure. FIG. 2A is a cross-sectional view of the electronic apparatus 1 taken along line A-A illustrated in FIG. 1. FIG. 2B is a cross-sectional view of the electronic apparatus 1 taken along line B-B illustrated in FIG. 1.

The electronic apparatus 1 according to the present embodiment is, for example, a tablet computer, and includes a host controller 2, a display panel 3, a sensor controller 4, and a sensor panel 5, as illustrated in FIG. 1.

The host controller 2 is a computer including a processor and a memory (both not illustrated). The processor reads and executes a program stored in the memory to perform various types of processing such as control of each section of the electronic apparatus 1 including the display panel 3 and the sensor controller 4 illustrated in FIG. 1 and execution of various types of applications including a drawing application. The memory includes a main memory such as a dynamic random access memory (DRAM) and an auxiliary storage device such as a flash memory.

As illustrated in FIGS. 2A and 2B, the display panel 3 is a device that includes a liquid-crystal module 21 and a metal frame 22. The liquid-crystal module 21 includes a plurality of pixels and a drive circuit for the pixels (both not illustrated). The metal frame 22 covers a side surface and a lower surface of the liquid-crystal module 21. The drive circuit performs arbitrary display on the display panel 3 by driving each pixel under the control of the host controller 2. Specific examples of the display panel 3 include a liquid-crystal display, an organic electroluminescence (EL) display, and electronic paper.

As illustrated in FIG. 1, a display region 3a and a bezel region 3b are provided on a surface of the display panel 3. The display region 3a is a rectangular region in which the pixels in the liquid-crystal module 21 are arranged in a matrix. The bezel region 3b is provided so as to surround an outer periphery of the display region 3a. The bezel region 3b includes the drive circuit in the liquid-crystal module 21 and routing traces (not illustrated) connecting each pixel to the drive circuit.

The sensor controller 4 and the sensor panel 5 are input devices for the host controller 2. As illustrated in FIGS. 2A and 2B, the sensor panel 5 includes an adhesive sheet 23, a film 24, an adhesive sheet 25, and a cover glass 26 stacked in this order from the edge closer to the display panel 3. The adhesive sheet 23 is a transparent adhesive such as an optical clear adhesive (OCA) or an optical clear resin (OCR). The adhesive sheet 25 is an OCA.

A plurality of linear electrodes 5x (second linear electrodes), a plurality of routing traces Lx (second routing traces), and one or more guard traces LG are fixed by the adhesive sheet 25 on an upper surface of the film 24. The plurality of routing traces Lx, which are not illustrated in FIGS. 2A and 2B, respectively connect the linear electrodes 5x to corresponding FPC connection terminals T described later. The one or more guard traces LG are connected to a specific potential such as a ground potential. A plurality of linear electrodes 5y (first linear electrodes), a plurality of routing traces Ly (first routing traces), and one or more guard traces LG are fixed by the adhesive sheet 23 on a lower surface of the film 24. The plurality of routing traces Ly respectively connect the linear electrodes 5y to corresponding FPC connection terminals T. If necessary, the traces formed on the upper surface of the film 24 and the traces formed on the lower surface of the film 24 may be connected to each other by via electrodes that penetrate through the film 24. Each of the plurality of linear electrodes 5x and 5y includes a plate-form conductor or a mesh-form conductor (a collection of fine traces arranged in a mesh form).

The upper surface of the cover glass 26 includes a touch surface 26a. The touch surface 26a is a flat surface to be touched by the active pen 10 or the user's finger. To allow the user to see the display region 3a of the display panel 3 through the sensor panel 5 at least in the display region 3a, each component of the sensor panel 5 including the cover glass 26 (and the linear electrodes 5x and 5y and the routing traces Lx and Ly) includes a transparent material or a non-transparent material whose configuration density allows light to pass through (for example, a mesh-form conductor as described above).

As illustrated in FIGS. 1, 2A, and 2B, a detection region 5a and a routing region 5b are provided on a surface of the sensor panel 5. The detection region 5a is a rectangular region in which position detection using each of the plurality of linear electrodes 5x and 5y, which is described later in detail, can be performed. As illustrated in FIG. 1, the area of the detection region 5a is slightly larger than the area of the display region 3a. The routing region 5b is provided so as to surround an outer periphery of the detection region 5a. The routing region 5b includes the plurality of routing traces Lx, the plurality of routing traces Ly, the one or more guard traces LG, and the plurality of FPC connection terminals T for connecting the plurality of routing traces Lx, the plurality of routing traces Ly, and the one or more guard traces LG to the sensor controller 4. As illustrated in FIG. 1, the plurality of FPC connection terminals T are arranged side by side along one edge of the sensor panel 5 having a rectangular shape. The one edge of the sensor panel 5 is parallel to the x direction.

As illustrated in FIG. 1, the plurality of linear electrodes 5x each extends in a y direction (first direction), which is the direction in the detection region 5a, and are disposed at equal intervals in the x direction (second direction), which is the direction that intersects or is perpendicular to the y direction in the detection region 5a. The plurality of linear electrodes 5y each extends in the x direction and are disposed at equal intervals in the y direction. Either the plurality of linear electrodes 5x or the plurality of linear electrodes 5y may be commonly used as common electrodes (not illustrated) in the liquid-crystal module 21, and the electronic apparatus 1 configured in this manner is called an "in-cell type." While seventeen linear electrodes 5x and seventeen linear electrodes 5y are illustrated in FIG. 1 and subsequent figures to simplify illustration, in actual implementation, a greater number of linear electrodes 5x and 5y may be disposed.

The sensor controller 4 is an IC including a processor and a memory (both not illustrated) and is disposed on a flexible printed circuit (FPC) board (not illustrated). This flexible printed circuit board is pressure bonded to the plurality of FPC connection terminals T disposed in the routing region 5b of the sensor panel 5, to thereby electrically connect the sensor controller 4 to each of the traces in the sensor panel 5.

Functionally, the sensor controller 4 is capable of detecting the position indicated by the active pen 10 and the position indicated by the user's finger (not illustrated) on the touch surface 26a and receiving a data signal transmitted from the active pen 10. These functions are performed by the processor of the sensor controller 4 reading and executing a program stored in the memory thereof. The position indicated by the active pen 10 is detected using a capacitive method or an active capacitive coupling method. The position indicated by the user's finger is detected using the capacitive method.

In the capacitive method, the position indicated by the active pen 10 or the user's finger is acquired on the basis of a change in capacitance that is generated between the plurality of linear electrodes 5x and 5y and a pen electrode (not illustrated) or the user's finger. The pen electrode is provided in the vicinity of a pen tip of the active pen 10. When the position detection is performed using the capacitive method, the sensor controller 4 sequentially supplies a predetermined detection signal to each of the plurality of linear electrodes 5x and measures the electric potential of each of the plurality of linear electrodes 5y each time the detection signal is supplied. When the pen electrode or the user's finger approaches an intersection of one of the linear electrodes 5x and one of the linear electrodes 5y, a portion of current flowing from the linear electrode 5x toward the linear electrode 5y flows into the user's body. This results in reduction in electric potential measured in the linear electrode 5y. The sensor controller 4 detects the indicated position using this change in electric potential.

In the active capacitive coupling method, a pen signal transmitted from the active pen 10 is received by the sensor panel 5 and, based on the reception result, the position indicated by the active pen 10 is detected. As described above, the pen signal includes a position signal and a data signal. The position signal is an unmodulated burst signal. The data signal indicates various types of data related to the active pen 10. The various types of data include, for example, pen pressure data indicating the pressure applied to the pen tip of the active pen 10.

When the indicated position is detected using the active capacitive coupling method, the sensor controller 4 receives a position signal at each of the plurality of linear electrodes 5x and 5y and, based on the reception result, detects the position indicated by the active pen 10. More specifically, the sensor controller 4 derives the x coordinate of the indicated position by interpolating the strength of the position signal received by each of the plurality of linear electrodes 5x using a predetermined interpolation method, while deriving the y coordinate of the indicated position by interpolating the strength of the position signal received by each of the plurality of linear electrodes 5y using a predetermined interpolation method. The sensor controller 4 detects the data signal transmitted from the active pen 10 by using the linear electrodes 5x and 5y closest to the indicated position among the plurality of linear electrodes 5x and 5y.

How the sensor controller 4 detects the indicated position will be described in more detail. The sensor controller 4 according to the present embodiment detects the position indicated by the active pen 10 and the position indicated by the user's finger using the above-described method (differential method) that employs a differential amplifier to reduce the influence of common mode noise (for example, noise generated in the display panel 3) applied (introduced) to the plurality of linear electrodes 5y (or the plurality of linear electrodes 5x) in the same direction.

More specifically, when the indicated position is detected using the capacitive method, the sensor controller 4 sequentially selects each of the plurality of linear electrodes 5x as the linear electrode 5x of interest, and supplies the predetermined detection signal to one or more adjacent linear electrodes 5x including the linear electrode 5x of interest. In this state, the sensor controller 4 sequentially selects each of the plurality of linear electrodes 5y as the linear electrode 5y of interest, and connects the linear electrode 5y of interest to a non-inverting input terminal of a differential amplifier and connects another linear electrode 5y disposed away from the linear electrode 5y of interest, separated by a predetermined number of linear electrodes 5y (including zero), to an inverting input terminal of the differential amplifier. Then, the sensor controller 4 detects the position indicated by the active pen 10 or the user's finger on the basis of the electric potential of an output signal of the differential amplifier.

When the indicated position is detected using the active capacitive coupling method, when the sensor controller 4 detects the x coordinate for example, the sensor controller 4 sequentially selects each of the plurality of linear electrodes 5x as the linear electrode 5x of interest and connects the linear electrode 5x of interest to a non-inverting input terminal of a differential amplifier and connects another linear electrode 5x disposed away from the linear electrode 5x of interest, separated by a predetermined number of linear electrodes 5x (including zero), to an inverting input terminal of the differential amplifier. Then, the sensor controller 4 detects the x coordinate of the position indicated by the active pen 10 on the basis of the electric potential of an output signal of the differential amplifier. Similarly, when the sensor controller 4 detects the y coordinate for example, the sensor controller 4 sequentially selects each of the plurality of linear electrodes 5y as the linear electrode 5y of interest and connects the linear electrode 5y of interest to a non-inverting input terminal of a differential amplifier and connects another linear electrode 5y disposed away from the linear electrode 5y of interest, separated by a predetermined number of linear electrodes 5y (including zero), an inverting input terminal of the differential amplifier. Then, the sensor controller 4 detects the y coordinate of the position indicated by the active pen 10 on the basis of the electric potential of an output signal of the differential amplifier.

By employing a position detection using the differential method as described above, the common mode noise applied (introduced) to the plurality of linear electrodes 5y (or the plurality of linear electrodes 5x) in the same direction is canceled in any of the capacitive method and the active capacitive coupling method. This allows the sensor controller 4 to accurately detect the indicated position without being affected by the common mode noise.

The sensor controller 4 reports, to the host controller 2, the coordinates detected as described above, which indicate the position indicated by the active pen 10 or the user's finger, and various types of data included in the data signal received from the active pen 10. In addition, the sensor controller 4 acquires pen-down information or pen-up information based on the pen pressure data received from the active pen 10 and reports the information to the host controller 2 at the corresponding timing. The pen-down information indicates that the active pen 10 has touched the touch surface 26a. The pen-up information indicates that the active pen 10 has left (e.g., is lifted from) the touch surface 26a.

In response to the input of the coordinates from the sensor controller 4, the host controller 2 performs at least one of pointer display and ink data generation. The host controller 2 performs the pointer display by displaying a predetermined pointer image at a position corresponding to the input coordinates on the display region 3a of the display panel 3.

Ink data includes control points and curve data. Each of the control points includes one of a plurality of sets of coordinates sequentially supplied from the sensor controller 4. The curve data is obtained by interpolating between the control points with a predetermined interpolation curve. In the case of the user's finger, the host controller 2 starts the ink data generation when the coordinate input starts, and ends the ink data generation when the coordinate input ends. In the case of the active pen 10, the host controller 2 starts the ink data generation when the pen-down information is input, and ends the ink data generation when the pen-up information is input. When the host controller 2 generates the ink data for the active pen 10, the host controller 2 also controls the width and/or the transparency of the curve data included in the ink data on the basis of, for example, the pen pressure data received from the active pen 10. The host controller 2 performs rendering of the generated ink data and causes the display panel 3 to display the data, while causing the memory of the host controller 2 to store the generated ink data.

Figure 3:
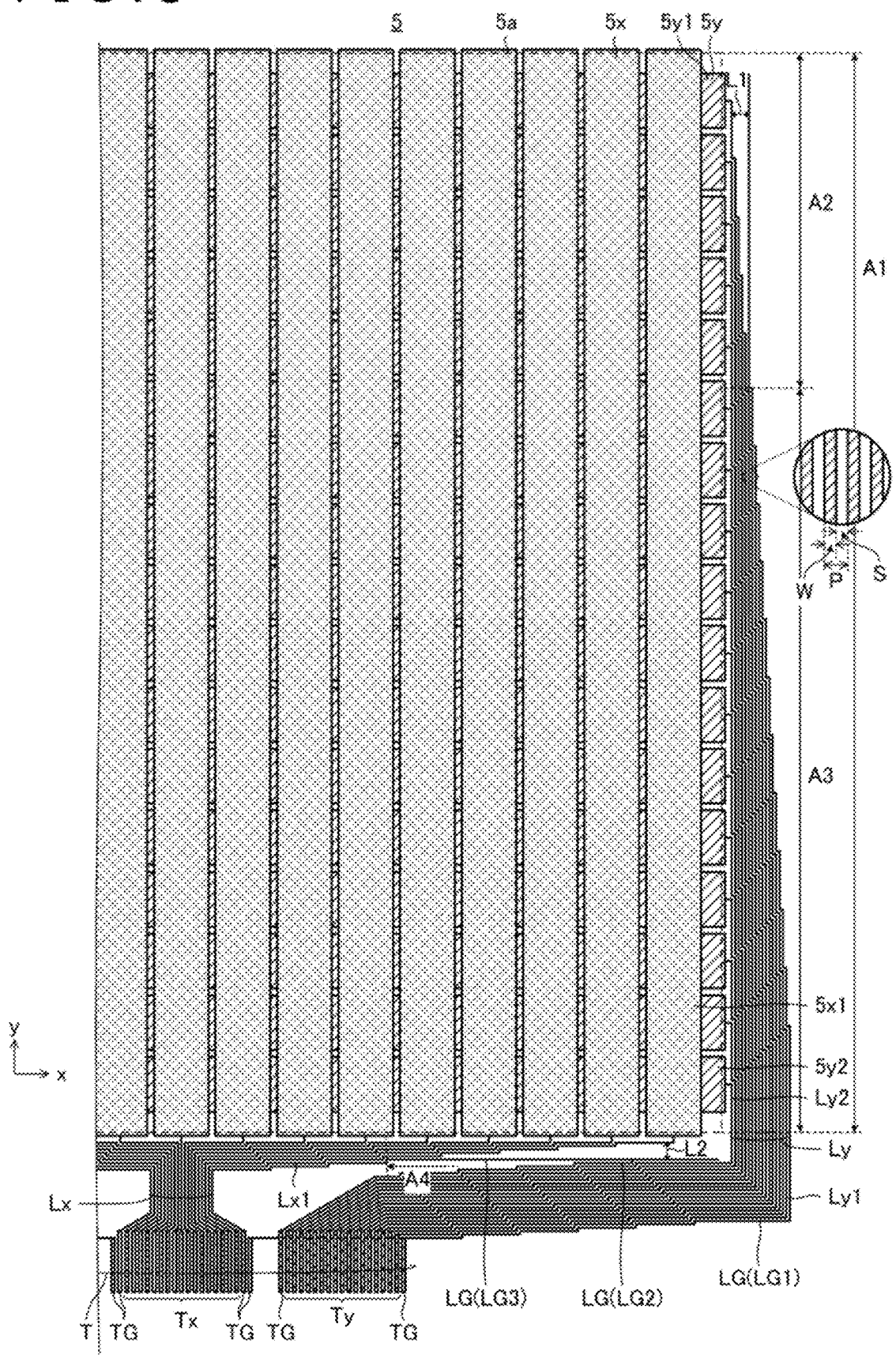
FIG. 3 is an enlarged view of a part of the sensor panel illustrated in FIG. 1.

FIG. 3 is an enlarged view of an approximately half of the sensor panel 5 illustrated in FIG. 1. The portion that is not illustrated in FIG. 3 and the portion illustrated in FIG. 3 are line-symmetrical with respect to a center line along the x direction serving as an axis of symmetry. The following description will focus on the portion illustrated in FIG. 3.

As illustrated in FIG. 3, each of the plurality of routing traces Lx is provided for a corresponding one of the plurality of linear electrodes 5x. Specifically, each routing trace Lx is connected to one end of a corresponding one of the linear electrodes 5x in the y direction. Each of the plurality of routing traces Ly is provided for a corresponding one of the plurality of linear electrodes 5y. Specifically, each routing trace Ly is connected to one end of a corresponding one of the linear electrodes 5y in the x direction. In the example illustrated in FIG. 3, the number of routing traces Ly provided for each linear electrode 5y is two. That is, one of the two routing traces Ly is connected to one end of the corresponding linear electrode 5y in the x direction, while the other routing trace Ly is connected to the other end of the corresponding linear electrode 5y in the x direction. Alternatively, the number of routing traces Ly provided for each linear electrode 5y may be one, as with the routing traces Lx.

Basically, the plurality of routing traces Lx extend in parallel with each other at an equal pitch in the x direction or the y direction, except in the vicinity of where the routing traces Lx are connected to the respective linear electrodes 5x, while the plurality of routing traces Ly extend in parallel with each other at an equal pitch in the x direction or the y direction, except in the vicinity of where the routing traces Yy are connected to the respective linear electrodes 5y. Such parallel arrangement of the plurality of routing traces Lx and Ly is to equalize the capacitance generated between each adjacent pair of traces. As illustrated in FIG. 3, pitch P of the routing traces Lx and Ly represents a total of a trace width W and an inter-trace space S (first interval). The trace width W is preferably set as small as possible to fit in a narrow frame or to minimize (unintended) reception of a pen signal in the routing traces Lx and Ly. For example, the trace width W is preferably 0.4 mm or less, more preferably 0.1 mm or less. The inter-trace space S is preferably set as small as possible in order to achieve the noise removal by the differential method. For example, the inter-trace space S is preferably 0.4 mm or less, more preferably 0.1 mm or less. The trace width W and the inter-trace space S may be the same value or different values. In the case of a pen imitating a thick pen tip of, for example, a marking pen and its detection system, the ranges of the respective trace width W and the inter-trace space S are not limited to the above-described ranges.

In the present embodiment, each of the plurality of routing traces Lx and Ly is formed in a stepped shape. This is because the number of routing traces Lx and Ly extending side by side increases as they get closer to the FPC connection terminals T. Alternatively, each of the plurality of routing traces Lx and Ly may be formed in an inclined shape, instead of a stepped shape. A second modification, described later, is an example in which each of the plurality of routing traces Lx and Ly is formed in an inclined (tilted) shape (see FIG. 5).

The plurality of FPC connection terminals T include a plurality of FPC connection terminals Tx (second terminals), a plurality of FPC connection terminals Ty (first terminals), and a plurality of FPC connection terminals TG (guard trace terminals). The plurality of FPC connection terminals Tx are provided for corresponding ones of the plurality of routing traces Lx. Specifically, each FPC connection terminal Tx is connected to a corresponding one of the plurality of routing traces Lx. The plurality of FPC connection terminals Ty are provided for corresponding ones of the plurality of routing traces Ly. Specifically, each FPC connection terminal Ty is connected to a corresponding one of the plurality of routing traces Ly. Each of the plurality of FPC connection terminals TG is connected to a corresponding one of the guard traces LG.

The plurality of FPC connection terminals Tx are disposed at equal intervals near the center along the x direction of a section of the routing region 5b, which is adjacent to the detection region 5a in the y direction as illustrated in FIG. 1. The plurality of FPC connection terminals Ty are disposed at equal intervals and on both sides (left and right sides) of the plurality of FPC connection terminals Tx along the x direction. The number of FPC connection terminals Ty disposed on each side of the plurality of FPC connection terminals Tx is equal to the number of linear electrodes 5y. One or more FPC connection terminals TG are disposed on each side of the plurality of FPC connection terminals Tx along the x direction (at positions adjacent to the outermost FPC connection terminals Tx, e.g., at the left-most and right-most terminals Tx). One or more FPC connection terminals TG are also disposed on each side of the plurality of FPC connection terminals Ty along the x direction (at positions adjacent to the outermost FPC connection terminals Ty, e.g., at the left-most and right-most terminals Ty).

Hereinafter, the linear electrode 5y disposed farthest from the plurality of FPC connection terminals Ty (the topmost linear electrode 5y in FIG. 3) may be particularly referred to as a linear electrode 5y1 (first electrode). The linear electrode 5y disposed closest to the plurality of FPC connection terminals Ty (the bottommost linear electrode 5y in FIG. 3) may be particularly referred to as a linear electrode 5y2. The linear electrode 5x disposed farthest from the plurality of FPC connection terminals Tx (the rightmost linear electrode 5x in FIG. 3) may be particularly referred to as a linear electrode 5x1 (second electrode). The routing trace Ly connected to the linear electrode 5y1 may be particularly referred to as a routing trace Ly1 (first trace). The routing trace Ly connected to the linear electrode 5y2 may be particularly referred to as a routing trace Ly2. The routing trace Lx connected to the linear electrode 5x1 may be particularly referred to as a routing trace Lx1.

One guard trace LG is disposed on each side of the plurality of routing traces Ly, which extend in parallel with each other at an equal pitch. One guard trace LG is also disposed on each edge of the plurality of routing traces Lx. Hereinafter, the guard trace LG extending and disposed on the side of the plurality of routing traces Ly, wherein said side is farther from the detection region 5a (the side of the routing trace Ly1), may be referred to as a guard trace LG1 (first guard trace). The guard trace LG extending and disposed on the other side of the plurality of routing traces Ly, wherein said other side is closer to the detection region 5a (the side of the routing trace Ly2), may be referred to as a guard trace LG2. The guard trace LG extending and disposed on the side of the plurality of routing traces Lx, wherein said side is farther from the detection region 5a, may be referred to as a guard trace LG3 (second guard trace). The guard trace LG2 extends in parallel with the routing trace Ly2, with the inter-trace space S interposed therebetween. As illustrated in FIG. 3, the guard traces LG2 and LG3, which are provided on opposite sides of the film 24 (see FIG. 2B), extend so as to overlap (or coincide) in the vicinity of the distal end from the respective FPC connection terminals TG.

One feature of the present disclosure is the configuration of the guard trace LG1. In the following description, issues of the guard trace LG1 in the related art will be described with reference to FIGS. 7 and 8. After that, the configuration of the guard trace LG1 according to the present embodiment will be described in detail.

Figure 7:
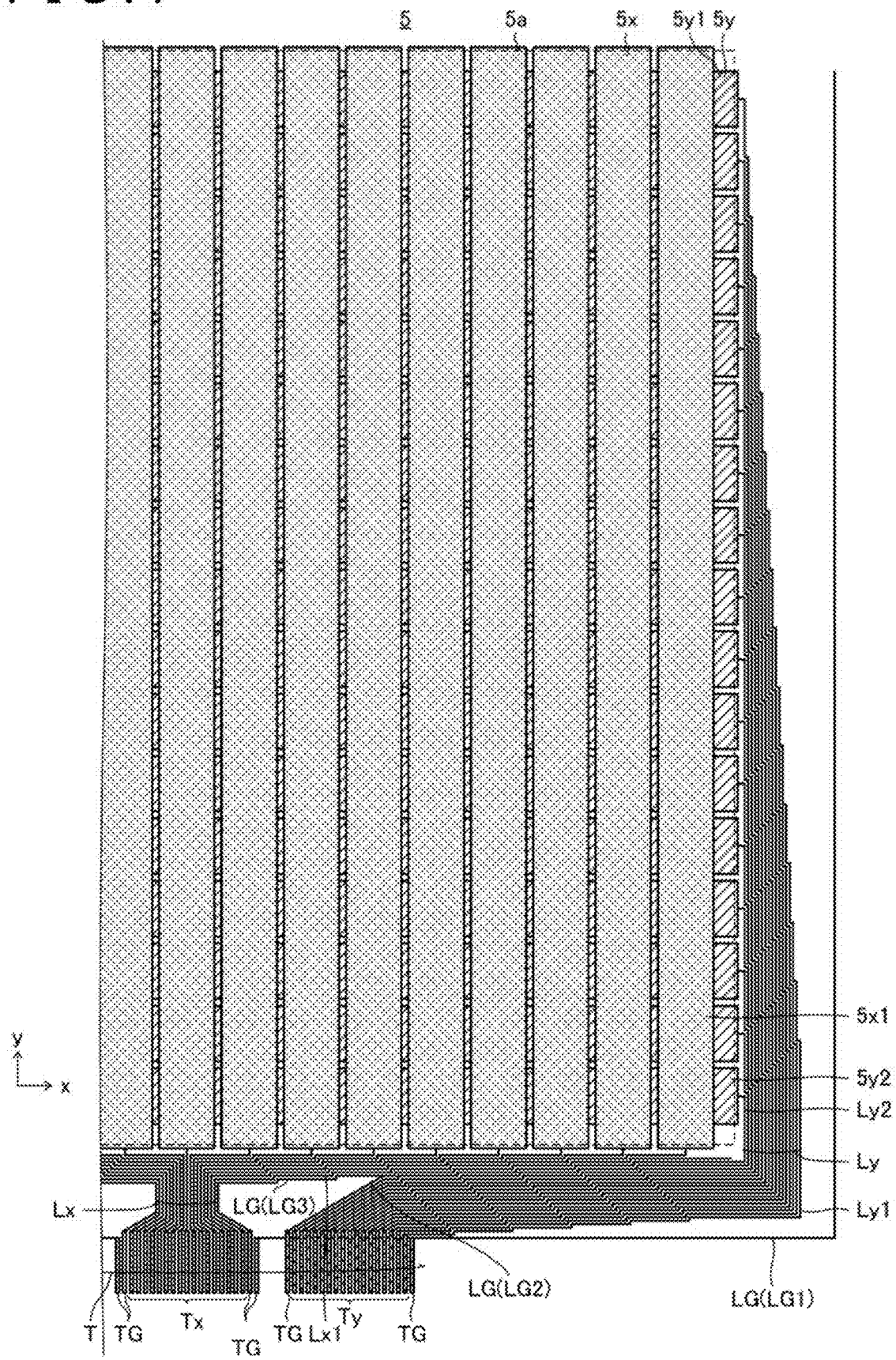
FIG. 7 is an enlarged view of a part of the sensor panel according to first related art, which is part of the disclosure of the inventor.
Figure 8:
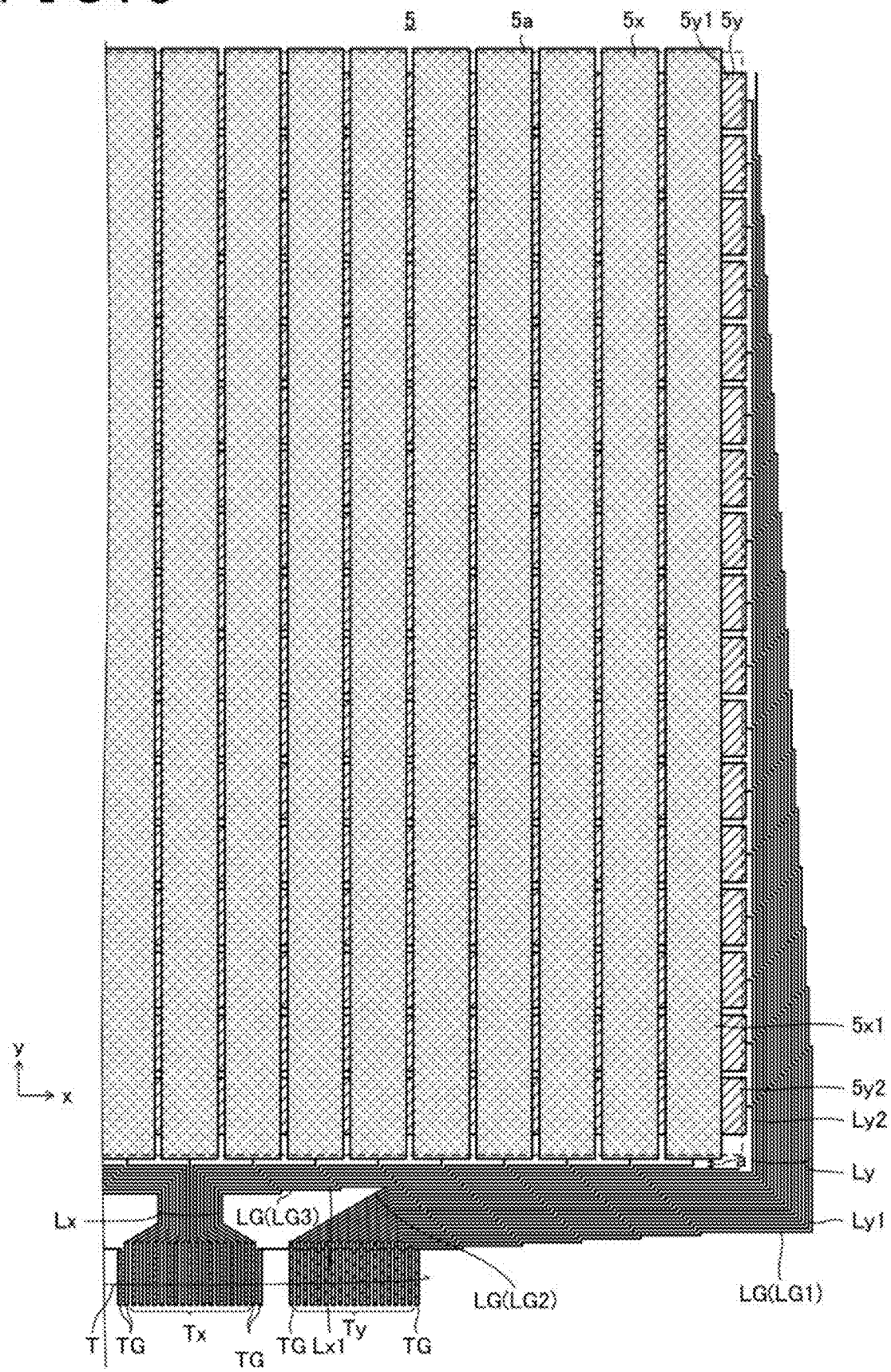
FIG. 8 is an enlarged view of a part of the sensor panel according to second related art, which is part of the disclosure of the inventor.

FIG. 7 is an enlarged view of a part of the sensor panel 5 according to the first related art of the present disclosure. FIG. 8 is an enlarged view of a part of the sensor panel 5 according to the second related art of the present disclosure. It is noted that that the first and second related art are part of the disclosure of the inventor of the present application and are heretofore not have been known at the time of filing of the present application.

Referring to FIG. 7, the guard trace LG1 according to the first related art extends along the outer periphery (not illustrated) of the rectangular sensor panel 5. The plurality of routing traces Ly extend adjacent to the plurality of routing traces Lx with a space interposed therebetween. The space has a width corresponding to the pitch P+the inter-trace space S, to allow placement of one guard trace LG therein, i.e., the guard trace LG2 and the guard trace LG3 that may extend on opposite sides of the film 24 (see FIG. 2B) while overlapping (or coinciding) with each other in the example of FIG. 7. With this configuration, since the distance between each routing trace Ly and the guard trace LG1 is too large, it is difficult to sufficiently block electromagnetic noise entering from outside.

One possible method to overcome this issue is illustrated in FIG. 8, in which the guard trace LG1 is configured so as to maintain a constant distance from the routing trace Ly1. With the configuration illustrated in FIG. 8, however, the capacitance between the guard trace LG1 and the outermost routing trace Ly1 alone, among the plurality of routing traces Ly extending side by side, increases. This has an undesirable impact on the removal of common mode noise by the differential method.

The configuration of the guard trace LG1 according to the present embodiment, on the other hand, can overcome the above-described issues and sufficiently block the electromagnetic noise entering from outside without unduly impacting the removal of the common mode noise by the differential method. More details will be described below with reference to FIG. 3 again.

In the configuration illustrated in FIG. 3, a separation distance L1 between the routing trace Ly1 and the guard trace LG1 in the x direction is not constant in a first region A1 adjacent to the detection region 5a in the x direction. The guard trace LG1 has portions (stepped portions) that intersect the y direction in the first region A1. More specifically, the guard trace LG1 extends linearly in the y direction in a second region A2 within the first region A1, wherein the second region A2 corresponds to only a portion of the linear electrodes 5y including the linear electrode 5y1 (approximately five linear electrodes 5y in FIG. 3) out of the total number of the plurality of linear electrodes 5y (seventeen linear electrodes 5y in FIG. 3). As a result, as the distance from the linear electrode 5y1 increases, the separation distance L1 between the routing trace Ly1 and the guard trace LG1 decreases. In a third region A3 within the first region A1, wherein the third region A3 is other than the second region A2 also within the first region A1, the guard trace LG1 extends so as to maintain a constant distance from the routing trace Ly1, and as a result, the guard trace LG1 is formed in a stepped shape similar to each routing trace Ly (including stepped portions which intersect/cross the y direction).

The distance (=the constant value) between the guard trace LG1 and the routing trace Ly1 in the third region A3 is set to a value equal to the inter-trace space S described above. For example, in a case where the inter-trace space S is 0.1 mm, the constant distance is 100 µm. This is because, if the guard trace LG1 and the routing trace Ly1 are too close to each other, the electromagnetic noise once absorbed by the guard trace LG1 may be transferred (or spill over) from the guard trace LG1 to the routing trace Ly1. By separating the guard trace LG1 from the routing trace Ly1 by a predetermined distance (at least the inter-trace space S or larger, for example), it becomes possible to avoid such spill-over phenomenon in which the electromagnetic noise may be transferred from the guard trace LG1 to the routing trace Ly1.

In principle, the boundary between the second region A2 and the third region A3 is determined on the basis of a positional relationship between the metal frame 22 and each routing trace Ly. This point will be described in detail with reference to FIG. 2B. A guard trace LGa indicated by a broken line in FIG. 2B represents the position of the guard trace LG in the configuration illustrated in FIG. 8. As illustrated in FIG. 2B, the metal frame 22 is positioned further outward than the guard trace LGa (to the side farther from the detection region 5a). In this case, most of the electromagnetic noise entering from outside is absorbed by the metal frame 22 before reaching the guard trace LGa. Therefore, the contribution of the guard trace LGa to block the electromagnetic noise is small. In other words, even if the guard trace LGa is positioned slightly away from the routing trace Ly, the influence is small in terms of blocking the electromagnetic noise. According to the present embodiment, therefore, the boundary between the second region A2 and the third region A3 is determined such that a region in which the metal frame 22 is positioned further outward than the guard trace LG becomes the second region A2, in reference to the configuration illustrated in FIG. 8 (the configuration in which the guard trace LG1 extends so as to maintain a constant distance from the routing trace Ly1). Accordingly, the guard trace LG1 can be positioned away from the routing trace Ly1 within the region (the second region A2) having limited influence on the electromagnetic noise blocking effect. With this configuration, undue impact on the removal of the common mode noise by the differential method can be suppressed while the influence on the electromagnetic noise blocking effect can also be suppressed.

In reality, however, it is often the case that the position of the metal frame 22 is unknown during production of the sensor panel 5. This is because, since the display panel 3 is a general-purpose product, what kind of display panel 3 is combined at assembly of the electronic apparatus 1 is often not yet determined during production of the sensor panel 5. Thus, as a more realistic approach, the boundary between the second region A2 and the third region A3 may be determined such that the above-described separation distance L1 becomes 300 µm or smaller. The value of 300 µm is the maximum separation distance L1 until which the electromagnetic noise entering from outside can be sufficiently blocked by the guard trace LG1. In the configuration illustrated in FIG. 3, the boundary between the second region A2 and the third region A3 is determined such that the separation distance L1 becomes 300 µm in the vicinity of the linear electrode 5y1 where the routing trace Ly1 and the guard trace LG1 are farthest from each other.

As described above, in the sensor panel 5 according to the present embodiment, the guard trace LG1 extends and is disposed sufficiently away from the routing trace Ly1 in the second region A2 in which the metal frame 22 of the display panel 3 is expected to block the electromagnetic noise. In the third region A3 in which no component other than the guard trace LG1 is expected to block the electromagnetic noise, the guard trace LG1 extends and is disposed sufficiently close to the routing trace Ly1. Since the guard trace LG1 is disposed away from the routing trace Ly1 in the second region A2, the capacitance between the routing trace Ly1 and the guard trace LG1 can be reduced while the electromagnetic noise entering the routing traces Ly from outside can be sufficiently blocked. With the sensor panel 5 according to the present embodiment, therefore, the electromagnetic noise entering from outside can be sufficiently blocked without unduly impacting the removal of the common mode noise by the differential method for the routing traces Ly and the linear electrodes 5y.

In the sensor panel 5 according to the present embodiment, the constant distance between the guard trace LG1 and the routing trace Ly1 in the third region A3 is maintained (specifically, the distance is equal to the inter-trace space S). This configuration can, therefore, prevent a spill-over phenomenon where the electromagnetic noise once absorbed by the guard trace LG1 is transferred from the guard trace LG1 to the routing trace Ly1.

In the sensor panel 5 according to the present embodiment, moreover, the distance between the routing trace Ly1 and the guard trace LG1 is minimized in the third region A3 in which the number of routing traces Ly extending side by side is larger than that in the second region A2. This configuration can, therefore, make the area of the routing region 5b small as compared to the area of the routing region 5b that is not configured according to the present embodiment. This configuration can, in turn, contribute to reduction of the bezel region 3b illustrated in FIG. 1 (that is, narrowing of the frame of the display panel 3).

With the sensor panel 5 according to the present embodiment, moreover, the electromagnetic noise entering from outside can be sufficiently blocked without unduly impacting the removal of the common mode noise by the differential method for the routing traces Lx and the linear electrodes 5x. This point will be described in detail below.

In the configuration illustrated in FIG. 3, the guard trace LG3 extends linearly in the x direction in a fourth region A4. The fourth region A4 corresponds to a range including the linear electrode 5x1 and the plurality of linear electrodes 5x (approximately five linear electrodes 5x in FIG. 3) smaller in number than a half of the total number of the plurality of linear electrodes 5x (8.5 linear electrodes 5x in FIG. 3). As a result, as the distance from the linear electrode 5x1 increases, a separation distance L2 between the routing trace Lx1 and the guard trace LG3 in the y direction decreases. In a region other than the fourth region A4, the guard trace LG3 extends so as to maintain a constant distance from the routing trace Lx1.

Similarly to the boundary between the second region A2 and the third region A3, the position of an end portion of the fourth region A4 is, in principle, determined on the basis of a positional relationship between the metal frame 22 and each routing trace Lx. As a more realistic approach, the position of the end portion of the fourth region A4 is determined such that the separation distance L2 becomes within a range of 300 μm or smaller.

As described above, with the configuration illustrated in FIG. 3, the guard trace LG3 extends and is disposed sufficiently away from the routing trace Lx1 in the region (the fourth region A4) in which the metal frame 22 of the display panel 3 overlapped with the sensor panel 5 is expected to block the electromagnetic noise. In the region other than the fourth region A4, the guard trace LG3 extends and is disposed sufficiently close to the routing trace Lx1. With the sensor panel 5 according to the present embodiment, therefore, the electromagnetic noise entering from outside can be sufficiently blocked without unduly impacting the removal of the common mode noise by the differential method for the routing traces Lx and the linear electrodes 5x as well.

Although the preferred embodiment of the present disclosure has been described, it is to be understood that the present disclosure is not limited to the above-described embodiment and may be implemented in various embodiments without departing from the scope of the present disclosure.

The boundary between the second region A2 and the third region A3 is determined on the basis of the positional relationship between the metal frame 22 and each routing trace Ly in the embodiment described above. For example, when there is any component other than the metal frame 22 that is expected to block the electromagnetic noise, the boundary between the second region A2 and the third region A3 may be determined on the basis of the positional relationship between this component and each routing trace Ly, as in the case of the metal frame 22. The same applies to the determination of the position of the end portion of the fourth region A4.

Figure 4:
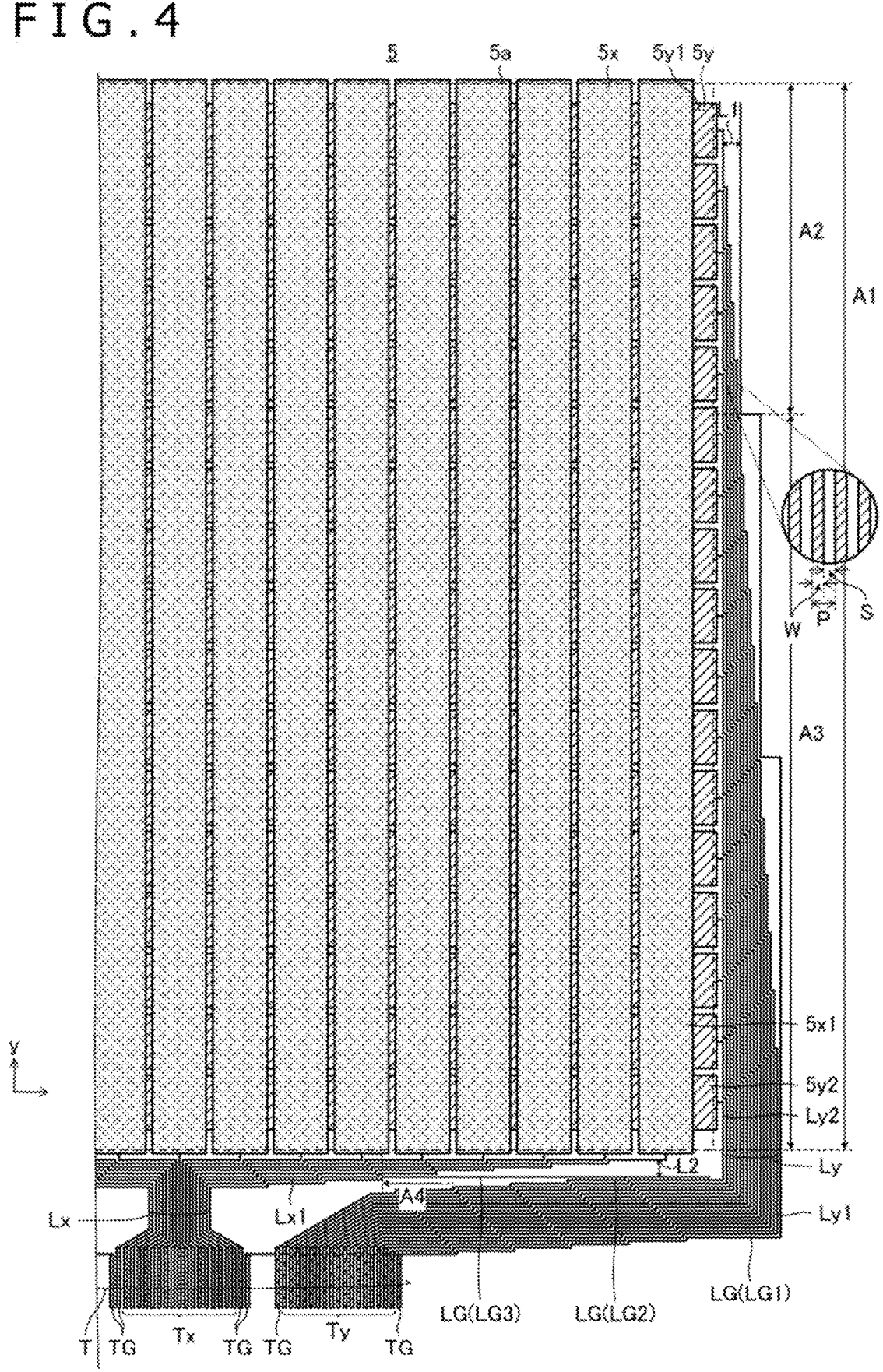
FIG. 4 is an enlarged view of a part of the sensor panel according to a first modification of the embodiment of the present disclosure.

FIG. 4 is an enlarged view of a part of the sensor panel 5 according to the first modification of the above-described embodiment. The present modification is different from the above-described embodiment in the shape of the guard trace LG1 in the third region A3 and is similar to the above-described embodiment in other points.

In the third region A3, the guard trace LG1 according to the present modification extends in a stepped shape with a smaller number of steps than the routing trace Ly1. As a result, although there are portions in which the separation distance L1 is larger than the inter-trace space S in the third region A3, the electromagnetic noise entering from outside can be sufficiently blocked by the guard trace LG1 as long as the separation distance L1 is within 300 μm or smaller. The present modification, therefore, further suppresses undue impact on the removal of the common mode noise by the differential method as compared to the above-described embodiment while sufficiently blocking the electromagnetic noise entering from outside.

Figure 5:
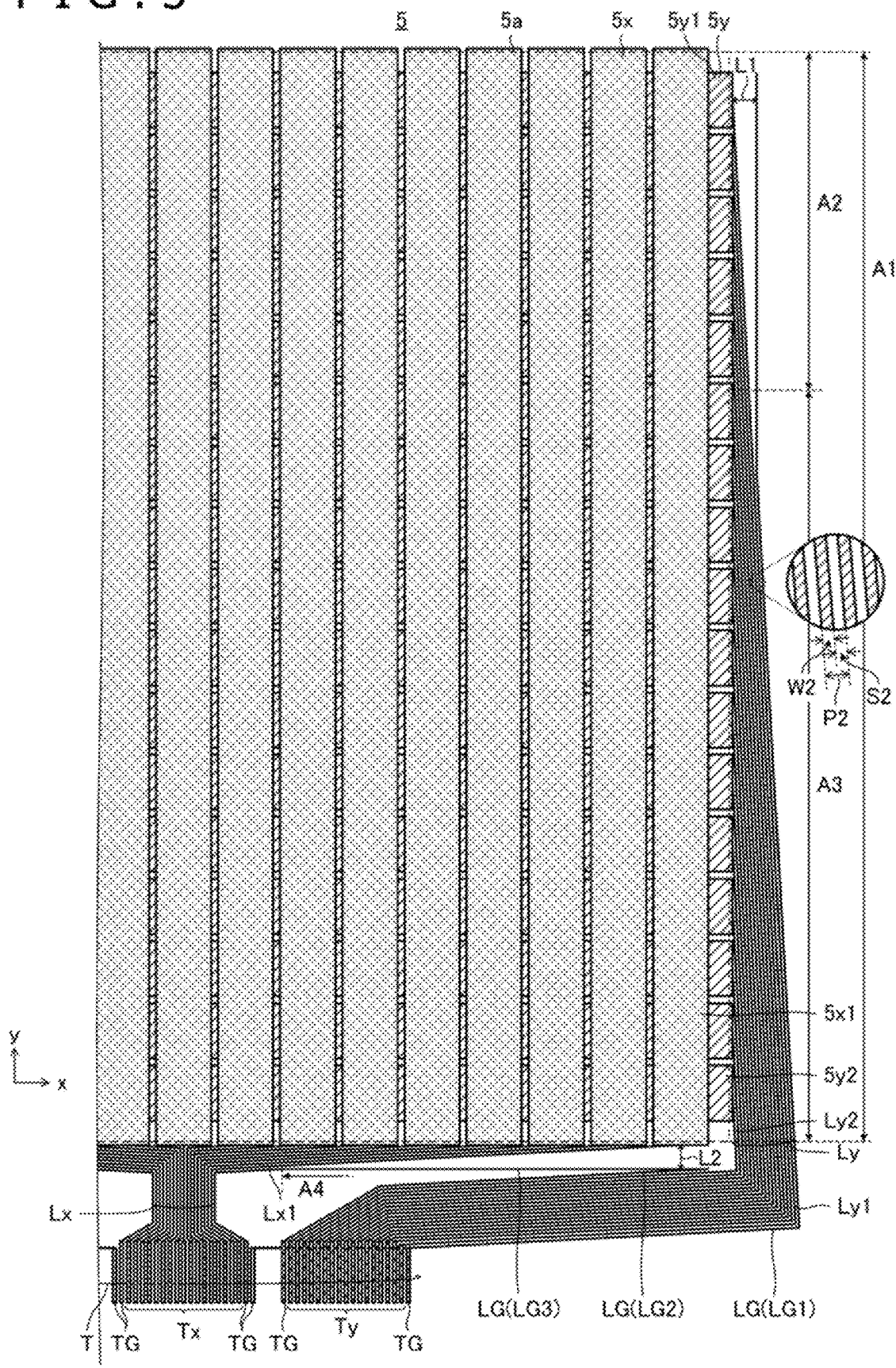
FIG. 5 is an enlarged view of a part of the sensor panel according to a second modification of the embodiment of the present disclosure.

FIG. 5 is an enlarged view of a part of the sensor panel 5 according to the second modification of the above-described embodiment. The present modification is different from the above-described embodiment in that each of the plurality of routing traces Lx and Ly extends not in a stepped shape but in an inclined shape in the x direction and the y direction, and accordingly, the entire guard trace LG2, the guard trace LG1, and a portion of the guard trace LG3 also extend in an inclined shape in the x direction and the y direction. The present modification is similar to the above-described embodiment in other points.

According to the present modification, the basic shapes of the above-described guard traces LG1 and LG3 are similar to those of the guard traces LG1 and LG3 according to the above-described embodiment. Similarly to the above-described embodiment, therefore, the electromagnetic noise entering from outside can be sufficiently blocked without unduly impacting the removal of the common mode noise by the differential method.

Figure 6:
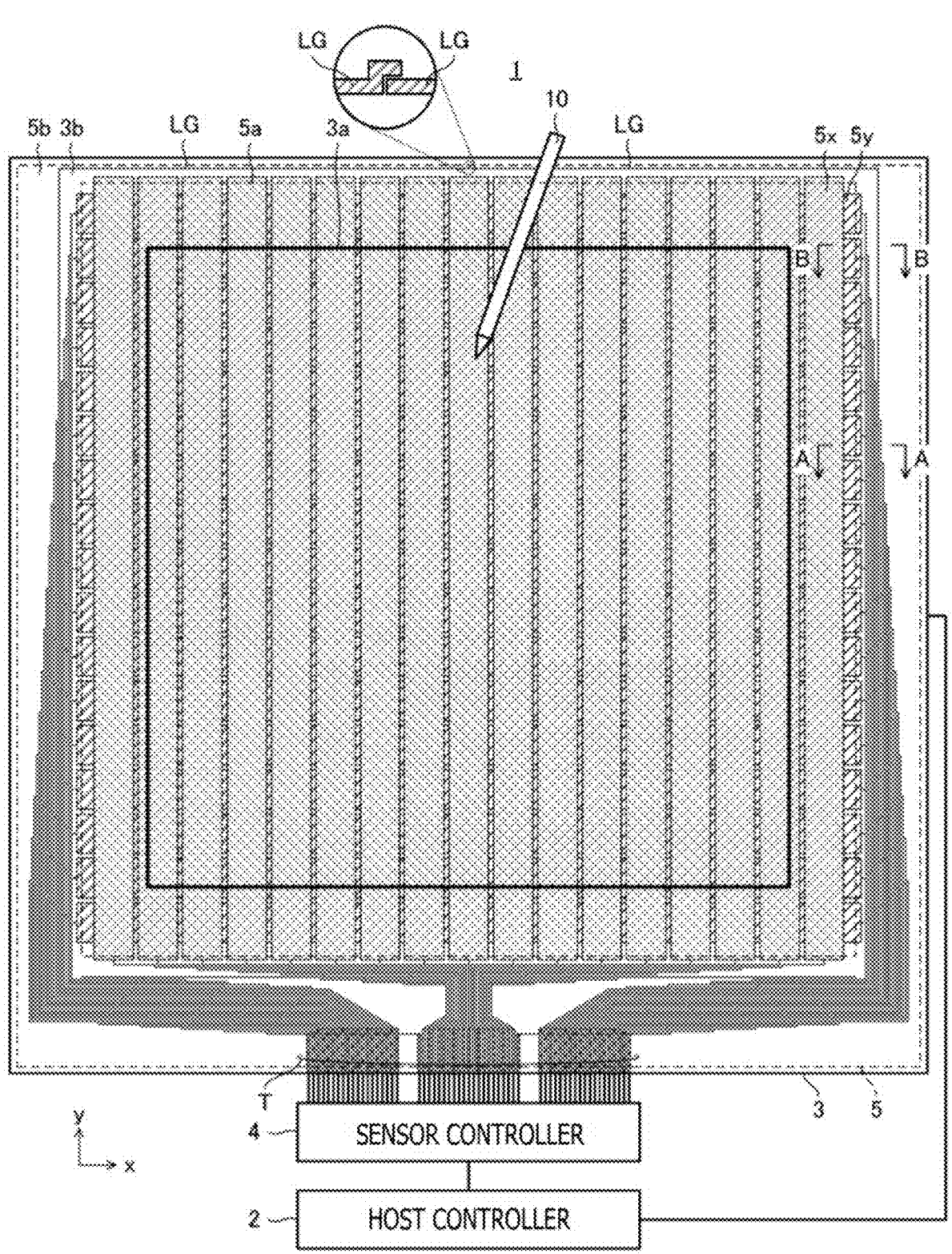
FIG. 6 is a schematic diagram illustrating configurations of the electronic apparatus including the sensor panel and the active pen according to a third modification of the embodiment of the present disclosure.

FIG. 6 is a schematic diagram illustrating configurations of the electronic apparatus 1 including the sensor panel 5 and the active pen 10 according to the third modification of the above-described embodiment. The present modification is different from the above-described embodiment in that the guard trace LG is additionally disposed above the detection region 5a. Specifically, this guard trace LG is disposed on the opposite side of the detection region 5a away from the side including the installation region of the FPC connection terminals T. The guard trace LG disposed above the detection region 5a is divided into two portions in the vicinity of the center: a right-side portion (a portion disposed on the right side of the detection region 5a relative to the installation region of the FPC connection terminals T) and a left-side portion (a portion disposed on the left side of the detection region 5a relative to the installation region of the FPC connection terminals T). As illustrated in an enlarged figure in FIG. 6, one end of the right-side portion (an end portion in the vicinity of the center of the detection region 5a) and one end of the left-side portion (an end portion in the vicinity of the center of the detection region 5a) face each other with a slight gap therebetween. The other end of the right-side portion is connected to the guard trace LG extending and disposed on the right side of the detection region 5a, while the other end of the left-side portion is connected to the guard trace LG extending and disposed on the left side of the detection region 5a.

According to the present modification, the basic shapes of the above-described guard traces LG1 and LG3 are similar to those of the guard traces LG1 and LG3 in the above-described embodiment. Similarly to the above-described embodiment, therefore, the electromagnetic noise entering from outside can be sufficiently blocked without unduly impacting the removal of the common mode noise by the differential method. According to the present modification, moreover, the portion above the detection region 5a is covered by the guard trace LG, and thus, the electromagnetic noise entering from the upper side can also be blocked.

According to the present modification, moreover, the guard trace LG disposed above the detection region 5a is divided into two portions and these portions face each other with a slight gap therebetween at their respective ends. With this configuration, even in a case where static electricity is generated during production of the sensor panel 5 in which no ground potential is supplied to the guard trace LG, the generated static electricity can be discharged in the form of a spark that occurs in the gap portion. This configuration can, therefore, prevent damage to the sensor panel 5.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A sensor device, comprising:
an integrated circuit configured to detect a position of an input object in a detection region, and
a sensor panel defining the detection region and connected to the integrated circuit, wherein the sensor panel includes:
a plurality of first linear electrodes each extending in a second direction in the detection region and disposed side by side in a first direction perpendicular to the second direction in the detection region;
a plurality of first routing traces disposed to be connected to corresponding ones of the plurality of first linear electrodes and extending in parallel with each other at an equal pitch;
a plurality of first terminals disposed side by side along one edge of the sensor panel and each connecting a corresponding one of the plurality of first routing traces to the integrated circuit, the one edge of the sensor panel being parallel to the second direction; and
a first guard trace extending and disposed on one side of the plurality of first routing traces farther from the detection region compared with another side of the plurality of first routing traces which is closer to the detection region,
wherein, in a first region adjacent to the detection region in the second direction, a separation distance between the first guard trace and a first trace in the second direction is not constant, wherein the first trace is one of the plurality of first routing traces connected to a first electrode that is disposed farthest away from the plurality of first terminals among the plurality of first linear electrodes, and
wherein the first guard trace in the first region has a portion intersecting the first direction.

2. The sensor device according to claim 1, wherein the first guard trace extends linearly in the first direction in a second region, wherein the second region is within the first region and corresponds to a range including less than all of the plurality of first linear electrodes wherein the less than all of the plurality of first linear electrodes includes the first electrode.

3. The sensor device according to claim 2, wherein a minimum separation distance between the first guard trace and the first trace is equal to an inter-trace space between the first routing traces.

4. The sensor device according to claim 2, wherein the first guard trace in a third region extends so as to maintain a constant distance from the first trace, wherein the third region is a region other than the second region within the first region.

5. The sensor device according to claim 1, wherein the sensor panel further includes:
a plurality of second linear electrodes each extending in the first direction in the detection region and disposed side by side in the second direction in the detection region;
a plurality of second routing traces disposed to be connected to corresponding ones of the plurality of second linear electrodes and extending in parallel with each other at an equal pitch;
a plurality of second terminals disposed side by side along the one edge of the sensor panel and each connecting a corresponding one of the plurality of second routing traces to the integrated circuit; and
a second guard trace extending and disposed on one side of the plurality of second routing traces farther from the detection region compared with another side of the plurality of second routing traces which is closer to the detection region,
wherein the second guard trace extends linearly in the second direction in a fourth region, the fourth region corresponding to a range including less than a half of the plurality of second linear electrodes wherein the less than half of the plurality of second linear electrodes includes one second linear electrode disposed farthest from the plurality of second terminals among the plurality of second linear electrodes.

6. The sensor device according to claim 1, wherein the sensor panel further includes:
a guard trace terminal disposed adjacent to one first terminal disposed at an outermost position among the plurality of first terminals,
wherein the first guard trace is connected to the guard trace terminal.

7. An electric device, comprising:
a processor configured to control operation of the electric device, and
a sensor device coupled to the processor and including:
an integrated circuit configured to detect a position of an input object in a detection region, and
a sensor panel defining the detection region and connected to the integrated circuit, wherein the sensor panel includes:
a plurality of first linear electrodes each extending in a second direction in the detection region and disposed side by side in a first direction perpendicular to the second direction in the detection region;
a plurality of first routing traces disposed to be connected to corresponding ones of the plurality of first linear electrodes and extending in parallel with each other at an equal pitch;
a plurality of first terminals disposed side by side along one edge of the sensor panel and each connecting a corresponding one of the plurality of first routing traces to the integrated circuit, the one edge of the sensor panel being parallel to the second direction; and
a first guard trace extending and disposed on one side of the plurality of first routing traces farther from the detection region compared with another side of the plurality of first routing traces which is closer to the detection region,
wherein, in a first region adjacent to the detection region in the second direction, a separation distance between the first guard trace and a first trace in the second direction is not constant, wherein the first trace is one of the plurality of first routing traces connected to a first electrode that is disposed farthest away from the plurality of first terminals among the plurality of first linear electrodes, and wherein the first guard trace in the first region has a portion intersecting the first direction.

8. The electric device according to claim 7, wherein the first guard trace extends linearly in the first direction in a second region, wherein the second region is within the first region and corresponds to a range including less than all of the plurality of first linear electrodes wherein the less than all of the plurality of first linear electrodes includes the first electrode.

9. The electric device according to claim 8, wherein a minimum separation distance between the first guard trace and the first trace is equal to an inter-trace space between the first routing traces.

10. The electric device according to claim 8, wherein the first guard trace in a third region extends so as to maintain a constant distance from the first trace, wherein the third region is a region other than the second region within the first region.

11. The electric device according to claim 7, wherein the sensor panel further includes:
- a plurality of second linear electrodes each extending in the first direction in the detection region and disposed side by side in the second direction in the detection region;
- a plurality of second routing traces disposed to be connected to corresponding ones of the plurality of second linear electrodes and extending in parallel with each other at an equal pitch;
- a plurality of second terminals disposed side by side along the one edge of the sensor panel and each connecting a corresponding one of the plurality of second routing traces to the integrated circuit; and
- a second guard trace extending and disposed on one side of the plurality of second routing traces farther from the detection region compared with another side of the plurality of second routing traces which is closer to the detection region, wherein the second guard trace extends linearly in the second direction in a fourth region, the fourth region corresponding to a range including less than a half of the plurality of second linear electrodes wherein the less than half of the plurality of second linear electrodes includes one second linear electrode disposed farthest from the plurality of second terminals among the plurality of second linear electrodes.

12. The electric device according to claim 7, wherein the sensor panel further includes:
- a guard trace terminal disposed adjacent to one first terminal disposed at an outermost position among the plurality of first terminals, wherein the first guard trace is connected to the guard trace terminal.

* * * * *